United States Patent
Emmerich

(10) Patent No.: US 8,769,799 B2
(45) Date of Patent: Jul. 8, 2014

(54) SELF LOCKING FASTENERS AND METHODS RELATING TO SAME

(76) Inventor: Scott J. Emmerich, Delavan, WI (US)

( * ) Notice: Subject to any disclaimer, the term of this patent is extended or adjusted under 35 U.S.C. 154(b) by 442 days.

(21) Appl. No.: 13/152,098

(22) Filed: Jun. 2, 2011

(65) Prior Publication Data

US 2011/0296668 A1    Dec. 8, 2011

Related U.S. Application Data

(60) Provisional application No. 61/350,813, filed on Jun. 2, 2010.

(51) Int. Cl.
*B23P 11/00* (2006.01)
*B25G 3/28* (2006.01)

(52) U.S. Cl.
USPC .................................. 29/525.02; 403/355

(58) Field of Classification Search
USPC ........... 29/525.02, 525.01, 428, 426.1, 426.5; 53/474; 470/2; 403/355; 411/356, 190, 411/300
See application file for complete search history.

(56) References Cited

U.S. PATENT DOCUMENTS

| | | | |
|---|---|---|---|
| 1,047,691 A * | 12/1912 | Olsen et al. | .................... 411/300 |
| 4,582,400 A | 4/1986 | Lough | |
| 4,845,871 A | 7/1989 | Swan | |
| 5,276,988 A | 1/1994 | Swan | |
| 5,680,725 A | 10/1997 | Bell | |
| 6,295,754 B1 | 10/2001 | Otteman et al. | |
| 6,606,813 B1 | 8/2003 | Squire et al. | |
| 7,272,904 B2 | 9/2007 | Larue | |
| 7,481,016 B2 | 1/2009 | Gonzalez | |
| 7,694,450 B2 | 4/2010 | Keng | |
| 2004/0000083 A1 | 1/2004 | Grant, Jr. | |
| 2005/0241212 A1 | 11/2005 | Swan | |
| 2005/0252060 A1 | 11/2005 | Gonzalez | |
| 2006/0123686 A1 | 6/2006 | Larue | |
| 2006/0179703 A1 | 8/2006 | Leatherwood | |
| 2006/0207156 A1 | 9/2006 | Larue | |
| 2007/0033852 A1 | 2/2007 | Adams | |
| 2008/0000134 A1 | 1/2008 | Peterson | |
| 2008/0034638 A1 | 2/2008 | Spuhr | |

* cited by examiner

*Primary Examiner* — John C Hong
(74) *Attorney, Agent, or Firm* — Fitch, Even, Tabin & Flannery, LLP

(57) ABSTRACT

A self locking fastener is disclosed herein which is self-contained and resists loosening even when used in applications and environments where the fastener is exposed to vibration. In one form the present invention provides a self locking screw-type fastener, methods of manufacturing and/or assembling such fasteners, and methods of fastening using such fasteners. In another form, the invention provides a self locking nut-type fastener, methods of manufacturing and/or assembling such fasteners, and methods of fastening using such fasteners. In still other forms, the invention provides components for creating self locking fasteners using at least in part conventional materials and/or fasteners, methods of manufacturing and/or assembling such fasteners, and methods of fastening using such fasteners. In another form, the invention provides prepackaged kits for customizable fasteners that purchasers can buy and use to assemble customized fasteners in accordance with the invention.

13 Claims, 10 Drawing Sheets

SECTION G-G
SCALE 4 : 1

SECTION M-M
SCALE 4 : 1

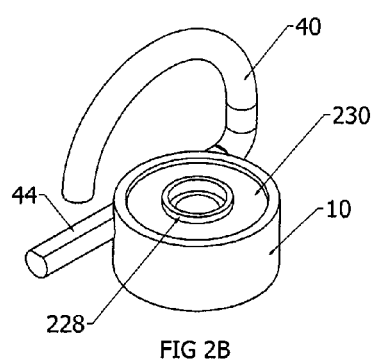
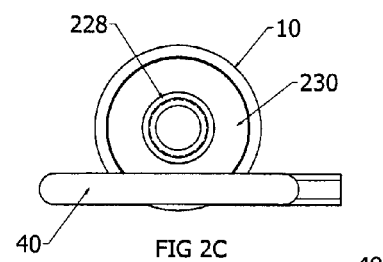
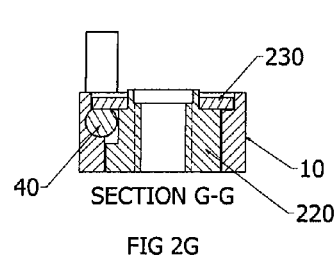
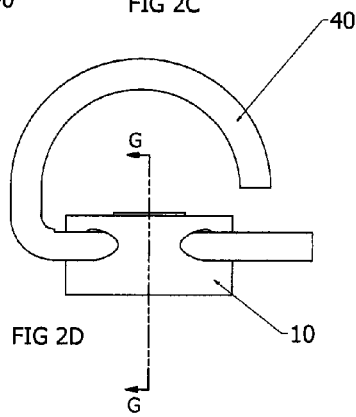
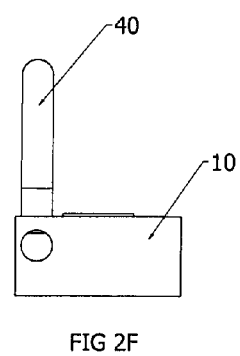
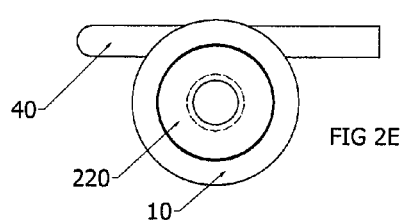

SECTION M-M
SCALE 4 : 1

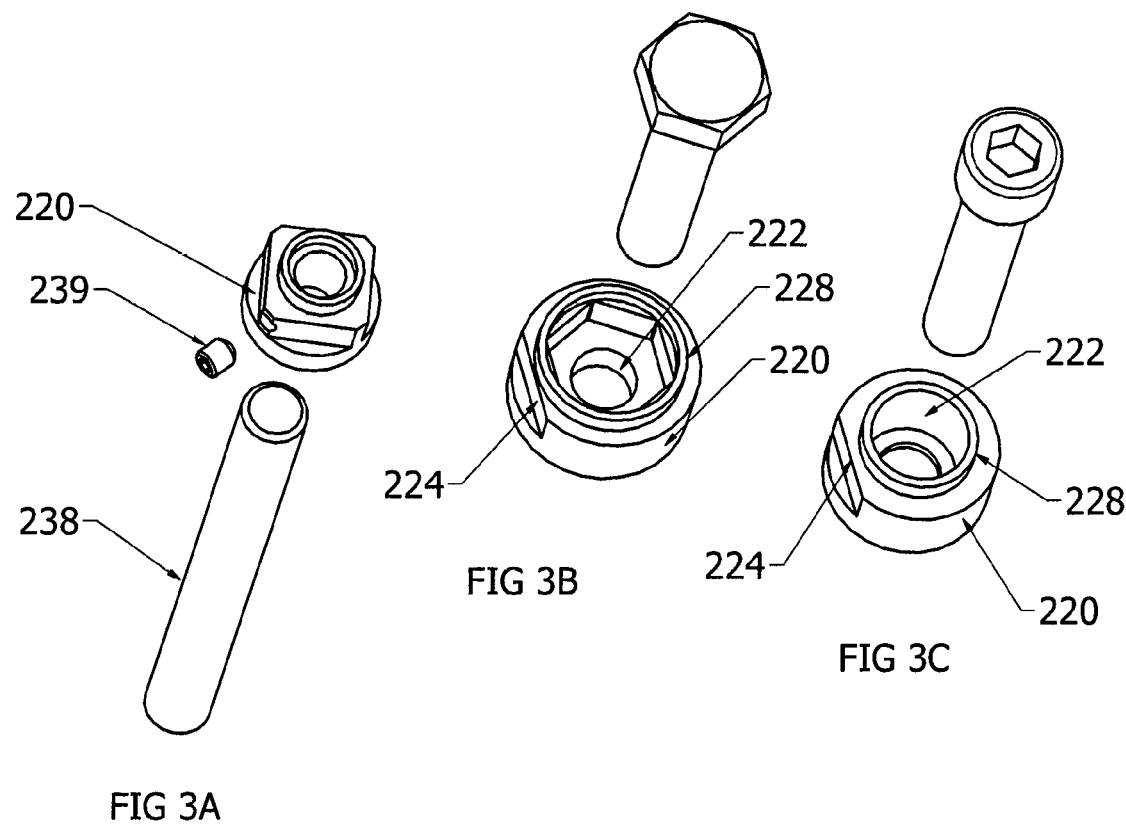

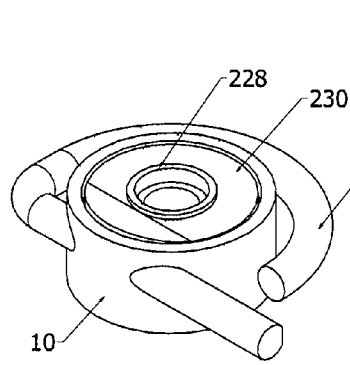
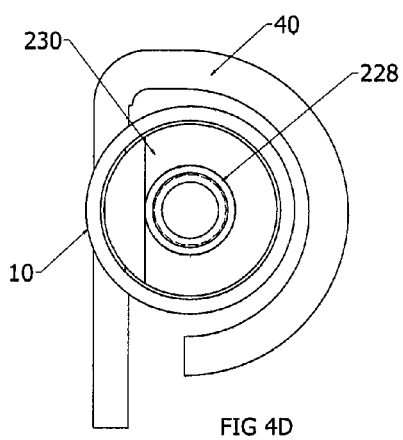
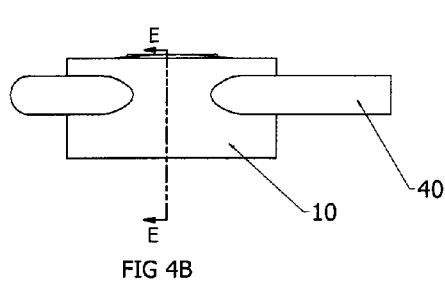
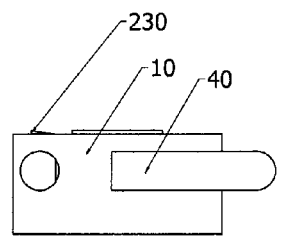
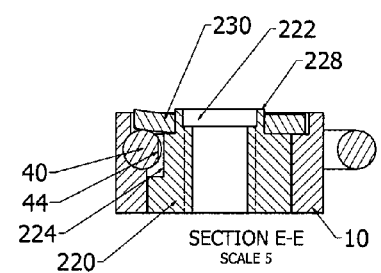
FIG 4A
FIG 4D
FIG 4B
FIG 4C
FIG 4E

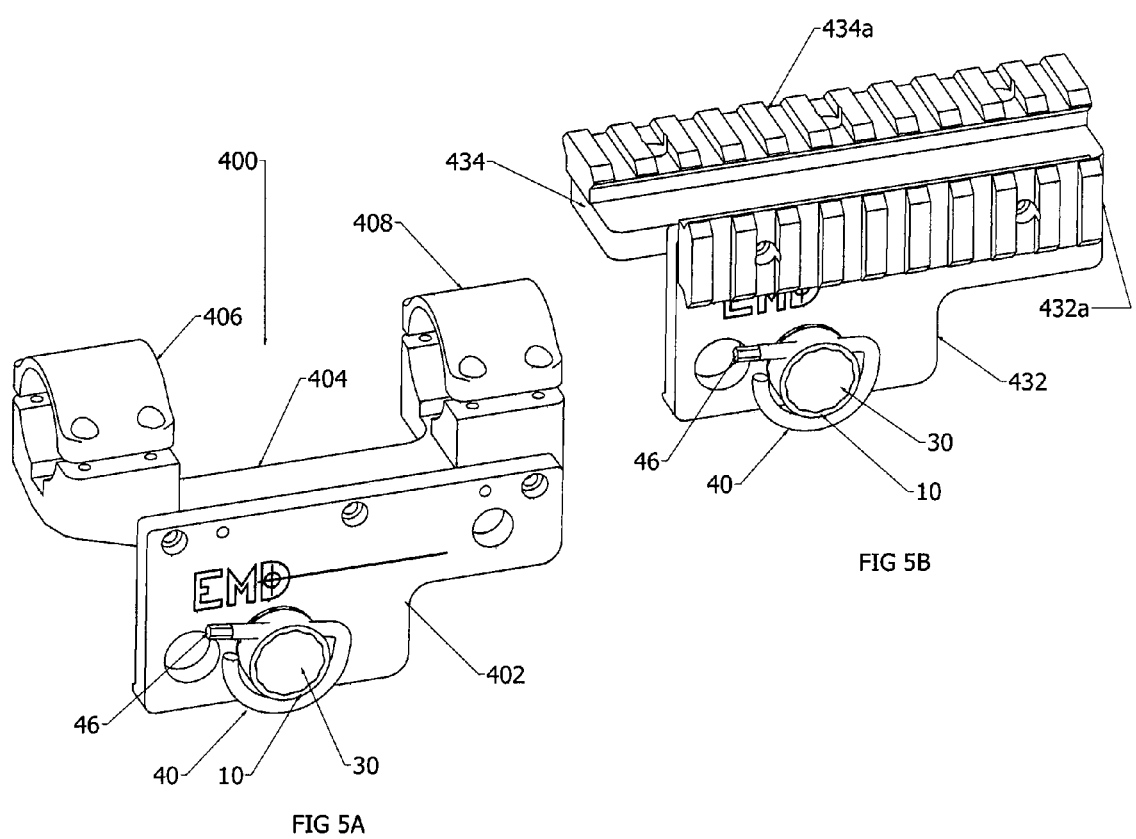

SELF LOCKING FASTENERS AND METHODS RELATING TO SAME

CROSS REFERENCE TO RELATED APPLICATIONS

The application claims the benefit of U.S. Provisional Application No. 61/350,813, filed Jun. 2, 2010, which is hereby incorporated herein by reference in its entirety.

FIELD OF THE INVENTION

The present invention relates to self locking fasteners and methods relating to same.

BACKGROUND OF THE INVENTION

Fasteners are used in a variety of applications. For example, some fasteners, such as thumb screws, are used to lock items down, or in place, or to secure items, and allow the fasteners to be easily removed without the need for hand tools to tighten or loosen the fastener. One problem with such fasteners, however, is that they are often prone to loosening do to external forces applied against them, such as vibration and other forms of interference. For example, thumb screws are used to secure scope mounts to some fire arms. Often times these thumb screws loosen due to the vibration the screws experience during operation of the fire arm. Eventually the screws may loosen or give way enough to cause the scope to move out of alignment and affect the accuracy of the scope and/or the fire arm operator's accuracy. Other problems associate with such fasteners relate to the methods associated with manufacturing and/or assembling these items and the methods for fastening associated with such items.

Prior attempts have been made to secure components to firearms using screws in combination with cam levers, detents and locking pins but all of these still have disadvantages. Original designs used simple thumb screws that easily loosened and required frequent hand tightening in order to remain secure in use. In later designs, as in U.S. Pat. No. 7,694,450, an eccentric cam is used to align or adjust the fit of the optical mount to the side of a M14 rifle receiver but a mechanical fastener ultimately holds the mount to the M14s receiver. Thus, with this design tools are still required to tighten the mechanical fastener, such as wrenches or other means of adding torque, and the fastener itself remains susceptible to loosening due to the vibration that the fastener is exposed to during the operation of the firearm. In other designs, as in U.S. Pat. No. 7,272,904, a throw lever connected to a tapered eccentric cam is used that engages the underside of a Weaver or Picatinney rail. This design is limited to only rail mounting systems and requires tools to adjust the ultimate holding force of the cam. Furthermore, it appears to also be susceptible to vibration and loosening as evident by the fact the same applicant has had to add a locking pin to the lever to prevent the lever from coming loose as disclosed in U.S. Pat. No. 7,272,904.

Accordingly, it has been determined that a need exists for an improved fastener and methods relating to same which overcome the aforementioned limitations and which further provide capabilities, features and functions, not available in current fasteners and methods relating to same.

SUMMARY OF THE INVENTION

A self locking fastener is disclosed herein which is self-contained and resists loosening even when used in applications and environments where the fastener is exposed to vibration. In one form the present invention provides a self locking screw-type fastener, methods of manufacturing and/or assembling such fasteners, and methods of fastening using such fasteners. In another form, the invention provides a self locking nut-type fastener, methods of manufacturing and/or assembling such fasteners, and methods of fastening using such fasteners. In still other forms, the invention provides components for creating self locking fasteners using at least in part conventional materials and/or fasteners, methods of manufacturing and/or assembling such fasteners, and methods of fastening using such fasteners. In another form, the invention provides prepackaged kits for customizable fasteners that purchasers can buy and use to assemble customized fasteners in accordance with the invention.

Many methods are also disclosed herein including but not limited to methods of manufacturing, methods of fastening, methods for fastening a screw or bolt, methods for fastening a nut or collar, methods for manufacturing fasteners including a method for manufacturing a screw or bolt and a method for manufacturing a nut, and methods of doing business such as methods of packaging fasteners for sale, methods of providing pre-packaged fasteners with pre-determined specifications and methods of selling customizable parts for the construction or assembly of customized fasteners for purchase.

These and other embodiments and methods of the invention will become apparent to one of ordinary skill in the art upon reading the detailed description of the invention that follows below.

BRIEF DESCRIPTION OF THE DRAWINGS

The invention will be explained in exemplary embodiments with reference to drawings, in which:

FIGS. 2B-F are perspective, plan, front elevational, bottom and side elevational views of the fastener of FIG. 2, respectively, with the cam handle in the unlocked position;

FIG. 2G is a cross-sectional view of the fastener of FIG. 2 taken along line G-G in FIG. 2D with the cam handle in the unlocked position;

FIGS. 3A-C are perspective views of alternate fastener components in accordance with other forms of the present invention;

FIGS. 4A-D are perspective, rear elevational, side elevational and plan views of the fastener of FIG. 2, respectively, illustrating the possible deflection that the washer can incur if the fastener is setup with such a configuration; and FIG. 4E is a cross-sectional view of the fastener of FIG. 2 taken along line E-E in FIG. 4B, further illustrating the possible deflection that the washer can incur if the fastener is setup with such a configuration; and FIGS. 5A-B are perspective views of alternate scope mounts in accordance with the present invention, with FIG. 5A illustrating a Weaver type mount and FIG. 5B illustrating a Pickatinny type mount.

Figure 1A:
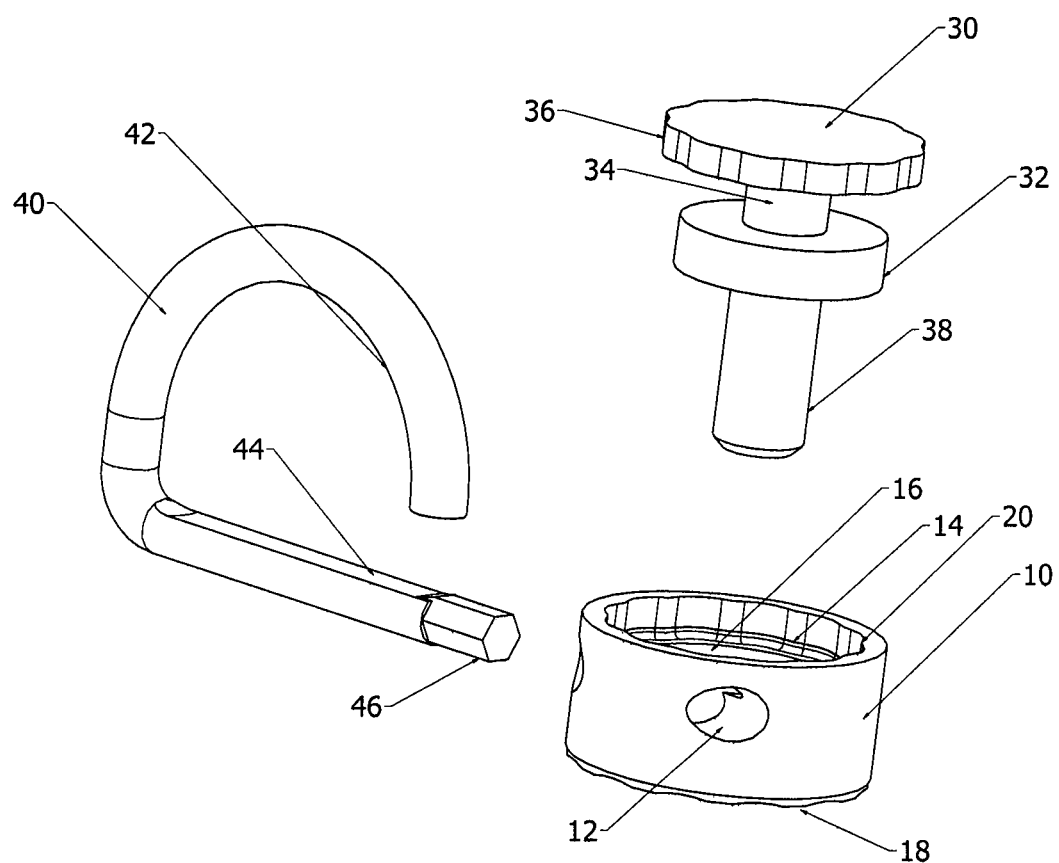
FIG. 1A is an exploded perspective view of a screw type fastener in accordance with one form of the present invention.
Figure 1B:
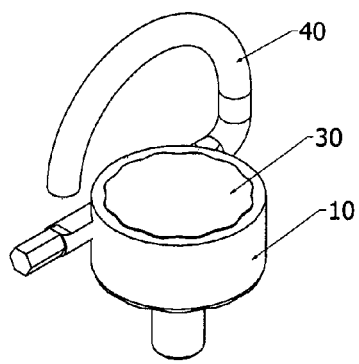
FIGS. 1B-F are perspective, plan, front elevational, bottom and side elevational views of the fastener of FIG. 1, respectively, with the cam handle in the unlocked position.
Figure 1C:
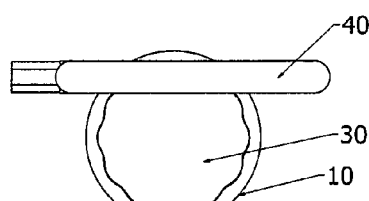

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended claims. Furthermore, skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENT

Self locking fasteners in accordance with the invention are disclosed herein and will be discussed in further detail below. In addition methods associated with said fastener are also disclosed including, but not limited to, methods of fastening, methods of manufacturing and assembling a fastener, methods of customizing a fastener and methods of packaging and selling a fastener.

In one form, the self locking fastener comprises a screw or bolt with a cup and a cam locking mechanism, such as a pin as illustrated in FIGS. 1A-M. In this embodiment the screw or bolt is designed with a shoulder portion, such as ring (32) located above the threaded shaft or shank (38) of the screw or bolt, with an upper head (30) that is located above the ring (32) and spaced apart therefrom to define an opening, such as groove (34), that a portion of locking pin (40) will occupy when the screw is inserted in the cup (10) and the locking pin (40) is inserted through the opening (12) of cup (10) as will be described further below. The upper head (30) preferably being of a certain thickness and diameter to be strong enough but enable a certain amount of deflection so as to develop a suitable amount of force between the head of the screw (30), the locking pin (40) and the cup (10), when assembled. In alternate embodiments, the ring (32) and/or shaft (44) of locking pin (40) may alternatively be designed to provide deflection instead of, or in addition to, the upper head (30) of the screw.

The cup (10) is formed as a round cylinder with a stepped interior that is designed to fit around the screw ring (32) and around the screw head (30), which in this embodiment has a larger diameter than the diameter of the ring (32). A hole (12) perpendicular to the primary axis of the cylinder, on a chord across the cylinder, serves to orient the locking pin (40) in the groove (34) between the ring (32) and the head of the screw (30). In alternate forms, the cup (10) may be shaped as a simple sleeve, rather than a cup, with an opening to position the locking pin (40) in the groove (34).

In the embodiment illustrated in FIG. 1A, the locking pin (40) comprises a round wire bent into a D shape to form a clip, and having a flattened portion (44) along the straight section of the "D" shaped clip which creates a D shaped cross section at least along the portion that is inserted into the cup (10). As may be better understood from looking at FIGS. 1G and 1M, the orientation of this D shape cross section allows the cup (10) to be closer to the screw head (30) with the D in the "up" position or with the flattened portion (44) of pin (40) facing up (see FIGS. 1G cross section). When the D rotates toward the "down" position or when the flattened portion (44) is moved to a position other than facing up (see FIG. 1M cross section), the cup (10) is held further away from the screw head (30) thereby causing the screw head (30) to deflect and exert downward pressure via the locking pin (40) on the cup (10).

In the form illustrated, the locking pin (40) includes an integrated tool that may be of other use for the particular application the fastener will be used in. For example, in FIGS. 1A-M, the pin (40) includes a hex key or head (46) for use tightening down and/or loosening bolts or screws with hexagonal head sockets like those used on rifles and/or in connection with rifle scopes and scope mounts. Thus, the fastener depicted serves as a multi-function tool in that it can be used both as a tool and a self locking fastener all in one. In alternate forms, other types of tools may be provided including but not limited to screwdrivers, punches, etc., or alternatively no additional tool end (46) may be provided. It should also be appreciated that the locking pin (40) may be designed with a variety of different shapes. For example, instead of leaving a larger gap between the distal end of the handle and the flattened portion (44) or tool end (46), the pin (40) could be provided with minimal gap so that it serves as more of an R pin or hairpin cotter pin that secures the pin (40) to the cup (10) when inserted through the cup (10). In yet other forms, the locking pin (40) could be designed as a simple shaft with a cammed surface instead of a handled pin as shown. Such a shaft could be designed with a ridge or bump to lock the pin into the cup (10) if desired. In still other embodiments other conventional types of pin and shaft designs may be used.

Now turning back to the embodiment illustrated in FIGS. 1A-M, with the screw head (30) inside the cup (10), at least a portion of the locking pin (40) can be passed through the alignment hole (12) in the cup (10), effectively holding all three pieces of the assembly together. With the D shaped cross section portion of the locking pin (40) in the "up" position or the flattened portion (44) facing up (see FIG. 1G cross section) the screw can be threaded into a mating hole (e.g., an internally threaded bore, an internally threaded nut, etc.). When the screw is hand tight, the D clip can be rotated to the "down" position where the flattened portion (44) is not facing up (see FIG. 1M cross section), effectively increasing the distance between the bottom of the cup (10) and the top of the head (30) of the screw. This increase in thickness (relating to the cam action of the pin (40)) is sized to create a substantial amount of force on the cup, effectively torquing the screw against the surface containing the mating hole that the screw has been threaded into or the surface that is positioned between the screw head (30) and the nut the fastener is being threaded into (if used in such a configuration).

In a preferred form, the screw head (30) and cup (10) are designed with a mating configuration that prevents the screw from rotating with respect to the cup (10) once positioned within cup (10). For example, in the embodiment illustrated in FIGS. 1A-M, the screw head (30) and cup (10) are designed with matching rosette patterns (36, 20) that allow the screw head (30) to be positioned within the cup (10) in a variety of different rotational directions, but then prevent rotational movement of the screw head (30) (and thus the screw) once inserted into the cup (10) due to the matching rosette pattern of the inner wall of the cup (10). The screw head (30) rests on the step (14) formed inside the cylinder of cup (10). In the form illustrated the rosette pattern provides twelve different orientations that the screw can be placed in with respect to the cup (10). In alternate embodiments, different mating configurations may be used providing as many different orientations (or plurality of orientations) as may be desired. For example, symmetrical mating configurations such as triangular, rectangular, hexagonal, Torx, starred or toothed, etc. shaped designs may be used to allow the screw head (30) to fit within the cup (10) while still preventing rotation. In yet other examples, asymmetric designs may be used to ensure that the screw head (30) (and thus screw) can only be fit within the cup (10) in one orientation. In still other embodiments, no mating structure may be used, for example, if rotation of the screw is desired within the cup (10). In the latter embodiment, the cup (10) may be designed with a threaded opening, if desired, and a set screw may be disposed in the threaded opening and used to fix the screw into a desired position with respect to the cup (10).

The cup (10) may also be formed with a design or surface to aid in preventing the cup (10) from rotating with respect to the surface of anything it comes into contact with. For example, in the embodiment illustrated in FIGS. 1A-M, the lower surface or bottom of the cup (10) is designed with a scalloped pattern (18) to create a frictional engagement between the bottom of the cup (and thus the cup itself) and whatever surface the bottom of the cup comes into contact with (e.g., the abutted surface). In yet other forms, a variety of different designs, surfaces (or surface textures), or coatings may be used on the bottom of the cup (10) to accomplish the above described frictional engagement between the cup and the surface it comes into contact with. For example, in one form a textured surface may be used on the bottom of cup (10) to create a frictional engagement between the cup (10) and the surface it comes into contact with when the fastener is attached to something. In another form a sticky coating may be applied to the bottom of the cup (10) to create such a frictional engagement. For example an adhesive, such as glue or double sided tape, may be applied to the bottom of the cup (10) to create the frictional engagement. In the case of double sided tape, for example, the tape may already be applied to the bottom surface of cup (10) on one side and a peelable film or membrane may be left over the opposite, exposed side of the tape so that a user can remove this film and membrane when they wish to have the cup (10) form a frictional engagement with whatever surface it comes into contact with. In still other forms, the bottom of the cup (10) may be designed with protrusions, such as angled barbs, that dig into the surface of whatever the fastener is being connected to in order to prevent rotation, or protrusions that engage a like pattern in the mating surface. In some application, however a cup (10) with a smooth bottom surface may be desired and therefore used. In yet other forms, all of these alternate designs, surfaces or coatings may be implemented on the ring (32) either in addition to or in lieu of the cup (10), if desired. It should also be appreciated that all of the alternate embodiments mentioned above may be used or implemented in the alternate fastener forms that will be discussed further below.

Thus, in the embodiment of FIGS. 1A-M, a self locking fastener is disclosed that is self-contained and resists loosening even when used in applications and environments where the fastener is exposed to vibration or shock. Unlike conventional fasteners, the cam actuator (40) is contained within the cup (10) and does not need to come into direct contact with the article that is being fastened. When actuated the cam actuator (40) applies force on the cup (10) to engage an external surface of one of the articles being fastened thereby causing the articles to be secured or clamped together so that one cannot move with respect to the other. In the form illustrated the screw head (30) serves as a spring that allows the fastener to apply the force on cup (10) which ultimately causes the clamping of the articles being fastened together.

Turning now to FIGS. 2A-M, in another form, the invention may comprise a fastener such as a nut with a cup, sleeve, washer and a cam locking mechanism. In this embodiment, the fastener is designed with a cup (10) and pin (40) similar to those discussed above with respect to FIGS. 1A-M, however, the fastener also includes a sleeve (220) and a washer (230). The sleeve (220) has a shoulder portion (226) with an inner collar (228) extending upward therefrom and a flattened side wall and step (224) on one side which engages the pin (40) when inserted through the holes (12) of cup (10). The inner collar (228) is coaxially aligned with the remainder of the sleeve (220) and has an inner opening that is larger in diameter than at least a portion of the remaining opening (222) defined by the sleeve (220) in order to form an inner shoulder or step within the diameter of the inner collar (228). In a preferred form the inner collar comprises a tubular rivet which the washer (230) can be positioned about via opening (232) and then the collar can be deformed (e.g., upset or bucked) to secure the washer (230) to the sleeve (220). Once connected in this manner the washer (230) and flattened side wall and step (224) form an opening, like opening (34) mentioned above, that can be aligned with the openings (12) of cup (10) to form a channel so that locking pin (40) can be inserted into the assembly through the channel formed by these parts.

With the washer (230) and sleeve (220) connected and inserted inside the cup (10), at least a portion of the locking pin (40) can be passed through the alignment holes (12) in the cup (10), effectively holding all four pieces of the assembly together. In the form illustrated, the remaining opening (222) of sleeve (220) may be threaded or partially threaded in order to accept a mating fastener such as a bolt or screw. Thus, when the D shaped cross section portion (44) of the locking pin (40) is in the "up" position or with the flattened portion (44) facing up (see FIG. 2G cross-section) the nut can be threaded onto the mating screw or bolt and when the nut is hand tight, the D clip (40) can be rotated to the "down" position where the flattened portion (44) is not facing up (see FIG. 2M cross-section), effectively increasing the distance between the bottom of the cup (10) and the washer (230) thereby causing the downward pressure on the nut to secure the nut and its mating fastener in position. As in FIGS. 1A-M, this increase in thickness (relating to the cam action of the pin (40)) is sized to create a substantial amount of force on the cup (10), effectively torquing the nut against the surface adjacent the nut and through which the mating fastener has been inserted.

Although a rivet configuration is used to secure the washer (230) to the sleeve (220), it should be understood that other fastening techniques and configurations may be used to secure the washer (230) to the sleeve (220) (e.g., interference fit, welding, pin or pins inserted through the collar (222) above the washer to secure the washer to the sleeve (220), set screws or simply posts threaded above the washer to prevent its removal, detents on the collar that the washer gets pressed over and then secured on the sleeve thereby, ball and detent configurations, etc.). In fact in other embodiments, the washer (230) may be formed integrally with the sleeve (220) so long as the washer (230) continues to allow the appropriate amount of deflection required to allow the necessary movement of the pin (40) to take place (e.g., to allow the above described cam or camming action to take place). If desired, the fastener could be designed such that the sleeve with integral washer could then be interference fit into the cup (10). In still others forms, the washer may be replaced with a threaded cap that screws onto the collar (222) and provides a surface for capturing the pin (40) while still allowing for deflection (e.g., if the fastener nut is not setup with the pin to deflect or the step (224) to deflect). In yet other forms, the nut fastener may be configured such that the sleeve (220) itself forms the groove within which the pin (40) is inserted and the sleeve is interference fit (e.g., like a press fit nut) into or reverse threaded into the cup (10).

It also should be understood that although the cup (10) and sleeve (220) are illustrated as having cylindrical configurations, these parts could take various other sizes and shapes in alternate embodiments if desired. For example, both the cup (10) and sleeve (220) could be configured with square or rectangular shapes. In one form, the shape of the sleeve (220) may be configured so that it matches a mating shape of the inner opening of the cup (10) so that the sleeve (220) cannot be rotated with respect to the cup (10) (or rotated separate and apart from the cup (10)) when disposed within the cup (10), (in a manner similar to that discussed above with respect to the mating shapes of the screw head (30) and cup opening (20) of FIGS. 1A-M).

Thus, in the embodiment of FIGS. 2A-M, a self locking nut type fastener is disclosed that is self-contained and resists loosening even when used in applications and environments where the fastener is exposed to vibration or shock. Unlike conventional fasteners, the cam actuator (40) is contained within the cup (10) and does not need to come into direct contact with the article that is being fastened. When actuated the cam actuator (40) applies force on the cup (10) to engage an external surface of one of the articles being fastened thereby causing the articles to be secured or clamped together so that one cannot move with respect to the other. In the form illustrated the washer (230) serves as a spring that allows the fastener to apply the force on cup (10) which ultimately causes the clamping of the articles being fastened together.

In yet another form, the invention may comprise a collar similar to the nut configuration illustrated in FIGS. 2A-M, but which may be used with a conventional fastener such as a screw or bolt to form a self locking fastener similar to that described in FIGS. 1A-M. For example, in the form illustrated in FIGS. 3A-C, a conventional screw or bolt could be inserted into the central opening (222) of the sleeve (220) so that the assembled component would look somewhat similar to the assembly of FIG. 1 and could be screwed or threaded into a mating opening when the pin (40) is in the "up" position or with the flattened portion (44) facing up, tightened until hand tight, and then locked into position by rotating the pin (40) into the "down" position or with the flattened portion (44) in a position other than facing up. The conventional screw or bolt could be captured within or by the inner collar (228) during the deforming step of the tubular rivet so that the upsetting or bucking of the rivet (228) not only secures the washer (230) to sleeve (220), but also provides an obstruction preventing the conventional fastener from being removed from the inner opening (222) of sleeve (220).

A portion of the central opening (222) of the sleeve (220) could also be configured to have a shape that mates with the head of the conventional fastener to ensure that the conventional fastener will rotate along with the rotation of the sleeve (220) and/or cup (10) and not independently of one and/or both of these parts. For example, in one form at least a portion of the central opening (222) may form a hexagonal socket within which the hex head of a conventional fastener is inserted (e.g., disposed or nested) so that the conventional fastener cannot be rotated independent of the sleeve (220). Other mating configurations or shapes could alternatively be used as discussed above with respect to the mating shapes of the screw head (30) and cup opening (20) of FIGS. 1A-M. For example, the conventional fastener could be interference fit (e.g., press fit, friction fit, etc.) into the inner opening (222) of sleeve (220) so that it does not rotate with respect to the sleeve (220) and/or cup (10). In one such form, the head of the conventional fastener may be star shaped (or starred) and press fit into the sleeve (220) like a press fit nut. In yet other embodiments, the fastener may comprise a threaded shank (238) disposed in sleeve (220) and secured thereto via a set screw (239) as shown in FIG. 3A. The sleeve (220) may also be designed with a shape that accommodates conventional tools, such as the rectangular head configuration illustrated which can be rotated using conventional sockets, pliers or wrenches, or alternate designs such as sockets for conventional screwdrivers. Besides providing a flat surface to prevent rotation of the sleeve (220) and shank (238) from rotating with respect to the cup (10) when the cam (40) is inserted through the openings (12) of the cup (10) and the fastener is fully assembled, another advantage to the rectangular shaped sleeve head illustrated in FIG. 3A is that the sleeve (220) can be positioned in one of four different orientations with respect to the cup (10) and the cam (40). Thus, if the fastener is not capable of giving the desired amount of clamping force when the shank and sleeve head are in a particular orientation, the cam (40) can be removed from the fastener and the shank (238) and sleeve head (220) can be positioned in a different orientation with respect to the cup (10) to see if the desired clamping force can be obtained. Alternatively, if desired the sleeve (220) could be designed with a scalloped pattern to provide additional orientations that the sleeve (220) could be positioned in with respect to the cup (10). With this configuration, shanks could be provided in a variety of different sizes, external thread pitches, diameters, etc., so that the fastener can be customized to suit the specific application intended.

Similarly, in addition to the fasteners themselves and the sale of a variety of different pre-packaged fasteners with pre-determined specifications, the manufacture and sale of individual parts and fittings for the fasteners is contemplated as well in order to allow end users to further customize the fasteners as they desire. For example, if an end user wished to use a different conventional fastener for the embodiment discussed immediately above, the end user could move the pin (40) into the "up" position so that the pin (40) can be removed from the cup (10) and the fastener can be disassembled. Spare sleeves (220) and washers (230) could be provided for purchase that would give the end user this flexibility. Thus, if the end user originally purchased a collar in accordance with the embodiment discussed above that was meant for use with a hex head conventional fastener and later changed his or her mind and wanted a collar that worked with a conventional fastener via an interference fit, spare sleeve (220) and washer (230) parts of this type could be provided either separately or as a kit. Similarly, if an end user purchased a nut in accordance with the description of FIG. 2 above and wanted to change the thread pitch or type of bolt or screw the nut worked with, spare sleeves (220) and/or washers (230) to accommodate this request could be provided either separately or as a kit. Still another request may require differing locking forces where the end user could request varying washer (230) thicknesses to accomplish this.

For convenience, the embodiments of FIGS. 1A-M and 2A-M are illustrated without showing any actual deflection of the materials illustrated for each embodiment because it is contemplated that fasteners made in accordance with the concepts discussed herein could use deflecting or bending screw heads (30) or washers (230) or, alternatively, could use cam shafts (44) or cups (10) that deflect or bend, or even a combination of any of these in order to lock the fastener in place. In a preferred form, however, the screw head (30) and washer (230) are designed to deflect when the cam shaft (44) is rotated between the "up" and "down" positions (or unlocked and locked positions, respectively). For example, in FIGS. 4A-E, the embodiment of FIGS. 2A-M, is illustrated showing the washer (230) being deflected up when the cam shaft (44) is in the locking position. Often times this deflection will be so minimal that it is almost imperceptible to the ordinary observer, however, the downward force this puts on the cup (10) is very much appreciable and secures the fastener in place such that it resists loosening even when exposed to vibration. The screw head (30) of FIGS. 1A-M would operate in much the same way as the washer (230) in FIGS. 4A-E (e.g., with the screw head (30) deflecting up when the cam shaft (44) is moved from the released position of FIG. 1G to the locked position of FIG. 1M). As discussed in the paragraph immediately above, the washer (230) and screw head (30) can be provided in varying thicknesses to achieve the desired amount of downward force placed on cup (10). It also should be appreciated that varying amounts of clamping force can be asserted simply by deciding how tight to turn or rotate the fastener before actuating or moving the cam (40) from the unlocked or released position illustrated in FIGS. 1G and 2G to the locked or secured position illustrated in FIGS. 1M and 2M. For example, in some applications it may be sufficient to rotate the fastener until the bottom of ring (32) or sleeve (220) just barely engages the abutting surface of the piece the fastener is being rotated into engagement with while still allowing the fastener to not vibrate loose. This will likely make the cam (40) easy to maneuver between the unlocked and locked positions by leaving a bigger gap between the bottom of the cup (10) and the abutting surface so that the cup (10) can easily be moved into and out of engagement with the abutting surface when the cam (40) is moved between the locking and unlocking positions, respectively. In other applications, it may be desirable to rotate the fastener until the bottom of ring (32) or sleeve (220) thoroughly engages the abutting surface thereby making the cam (40) more difficult to maneuver between the unlocked and locked positions by leaving a smaller gap (if any) between the bottom of cup (10) and the abutting surface so that the cap (10) is harder to move into and out of engagement with the abutting surface. It should be understood that one benefit of keeping a gap between the bottom of the cup (10) and the abutting surface is to prevent the bottom of cup (10) from scraping or marring the abutting surface while the fastener is being rotated into further engagement with this surface. Thus, in the form illustrated, the scalloped design of the bottom of cup (10) only engages the abutting surface when the cam (40) is moved between the locked and unlocked position (or when the cup (10) is driven into and out of engagement with the abutting surface, respectively). However, as discussed above, in alternate embodiments the fastener may be designed so that the frictional design or surface of bottom of cup (10) engages the abutting surface earlier and digs into the surface to ensure that the cup (10) solidly engages the abutting surface and/or is prevented from rotating or moving with respect thereto.

In view of the above, it should be understood that many methods are also disclosed herein including but not limited to methods of manufacturing, methods of fastening, methods of doing business and the like. For example, disclosed herein are methods for manufacturing fasteners including a method for manufacturing a screw or bolt and a method for manufacturing a nut. In addition, disclosed herein are methods of fastening including a method for fastening a screw or bolt and a method for fastening a nut or collar. Still further, methods of doing business such as methods of packaging fasteners for sale are disclosed herein including a method of providing pre-packaged fasteners with pre-determined specifications and a method of selling customizable parts for the construction or assembly of customized fasteners for purchase. Similarly, it should be understood that the variety of alternate embodiments described above for each form of the faster could be used or implemented on any of the fasteners disclosed or contemplated by the disclosure herein.

It should also be understood that many different materials may be used to manufacture fasteners in accordance with the concepts discussed herein. In the embodiments illustrated and discussed above, the components may be constructed of materials including, but not limited to, 4140 quenched and tempered steel for the screw (30) illustrated in FIGS. 1A-M, oil hardened 1075 and 1095 spring steel and 200 series stainless steel for the washer (230) illustrated in FIGS. 2A-M and 4A-E, and ring (40). The cup can be machined from 1020, 1045, 12L14 4140 quenched and tempered steel and stainless steel. For mass production the sleeve (220) and the cup (10) could be injection molded out of zinc. Still in other lighter applications aluminum alloys could be used for components or a combination of aluminum and steel could be used. For example, in one form requiring a lighter fastener, everything except the spring washer (230) and the ring (40) could be provided in aluminum alloy. In yet other forms, polymers such as plastic may be used to construct fasteners in accordance with the concepts discussed herein or combinations of plastics and metal may be use to construct such fasteners.

In addition it should be understood that fasteners in accordance with the concepts discussed herein may be used for a variety of different applications. Some examples of applications for these fasteners include, but are not limited to, mounting hardware and components in the fields of photography, recreational equipment, industrial components, firearm accessories, automotive components, aircraft and aerospace. Any application that requires mounting or holding of a component to another or the closing of items by use of a fastener and is beneficial to lock and unlock without tools and create a holding force that is vibration resistant to loosening or untightening.

For example, in one specific application, scope mounts are sold for firearms that use thumb screws for securing the scope mount and ultimately the scope to the firearm. During use, conventional thumb screws often (if not always) loosen due to the vibration experienced by the screw during operation or repeated operation of the weapon. In later designs, such as in U.S. Pat. No. 7,694,450, an eccentric cam is used to align or adjust the fit of the optical mount to the side of a M14 rifle receiver but a mechanical fastener ultimately holds the mount to the M14s receiver. Thus, with this design tools are still required to tighten the mechanical fastener, such as wrenches or other means of adding torque, and the fastener itself remains susceptible to loosening due to the vibration that the fastener is exposed to during the operation of the firearm. In other designs, such as in U.S. Pat. No. 7,272,904, a throw lever connected to a tapered eccentric cam is used that engages the underside of a Weaver or Picatinney rail. This design is limited to only rail mounting systems and requires tools to adjust the ultimate holding force of the cam. Furthermore, it appears to also be susceptible to vibration and loosening as evident by the fact the same applicant has had to add a locking pin to the lever to prevent the lever from coming loose as disclosed in U.S. Patent Application No. 2006/0207156.

As is evident by the problems that are associated with the above referenced patents, there still remains a need to provide a fastener that allows the user to secure components to firearms or other bodies with a shock and vibration resistant holding force but without the need for tools. The locking fastener disclosed herein is different from prior art fasteners in at least one way because it possesses the ability to be tightened hand tight and then by use of a self contained cam lever, add an additional securing force to resist loosening due to shock and vibration. This design is flexible in that it can be used as a screw, nut or a receiver that accepts a variety of different pre-manufactured screws and bolts, giving the user many different configurations and sizes to choose from. This screw can easily be fit for use with many existing optical mounts currently on the market but would have the benefit of a fastener that does not require tools for assembly and provides a shock and vibration resistant holding force.

Figure 1G:
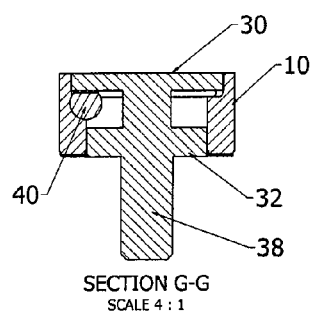
FIG. 1G is a cross-sectional view of the fastener of FIG. 1 taken along line G-G in FIG. 1D with the cam handle in the unlocked position.
Figure 1D:
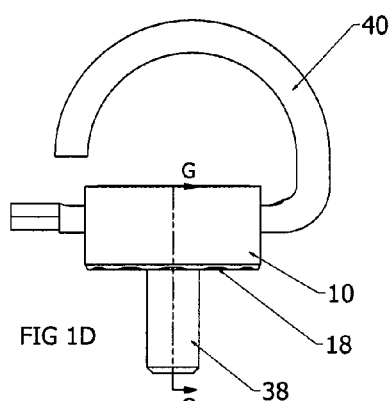
Figure 1F:
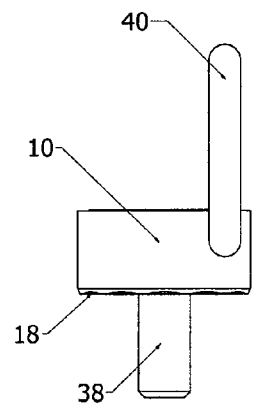
Figure 1E:
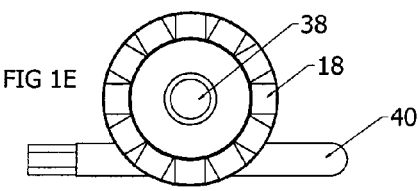
Figure 1H:
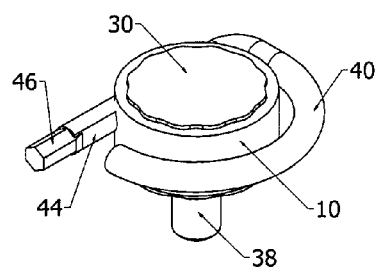
FIGS. 1H-L are perspective, plan, front elevational, bottom and side elevational views of the fastener of FIG. 1, respectively, with the cam handle in the locked position.
Figure 1I:
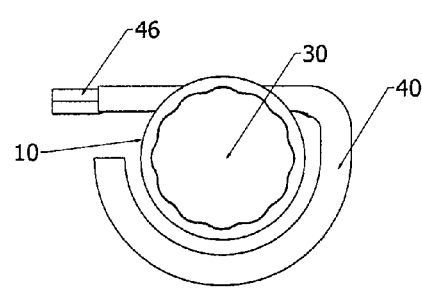
Figure 1M:
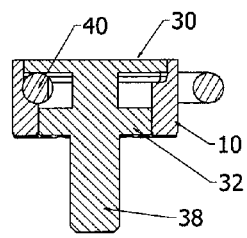
FIG. 1M is a cross-sectional view of the fastener of FIG. 1 taken along line M-M in FIG. 1J with the cam handle in the locked position.
Figure 1J:
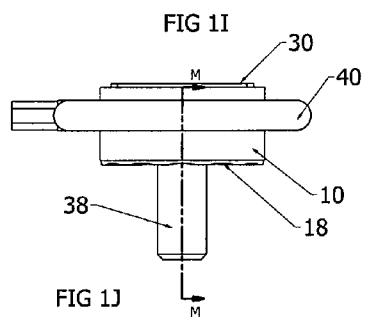
Figure 1L:
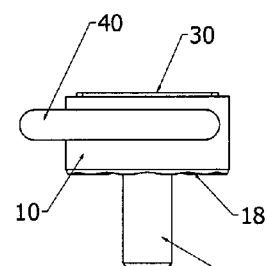
Figure 1K:
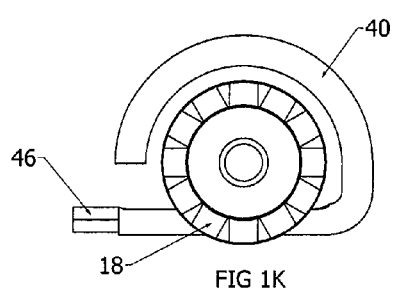
Figure 2A:
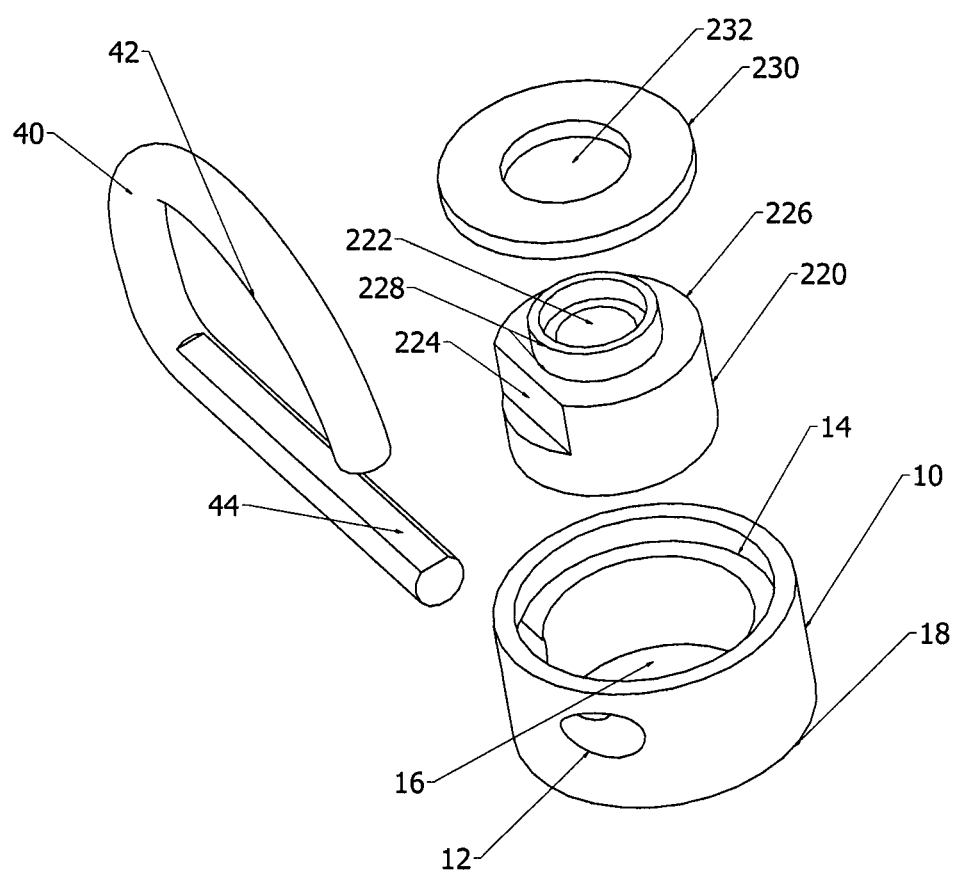
FIG. 2A is an exploded perspective view of a nut type fastener in accordance with another form of the present invention.
Figure 2H:
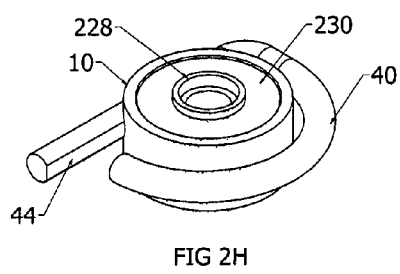
FIGS. 2H-L are perspective, plan, front elevational, bottom and side elevational views of the fastener of FIG. 2 with the cam handle in the locked position.
Figure 2I:
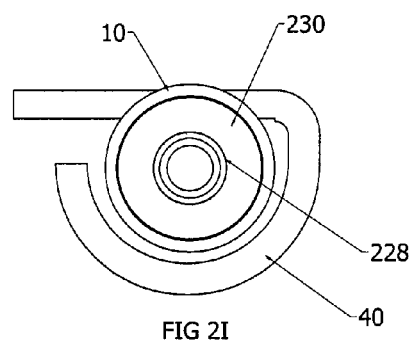
Figure 2M:
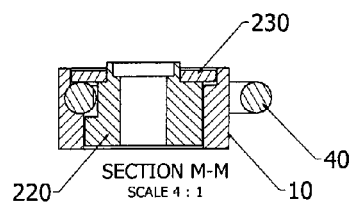
FIG. 2M is a cross-sectional view of the fastener of FIG. 2 taken along line M-M in FIG. 2J with the cam handle in the locked position.
Figure 2J:
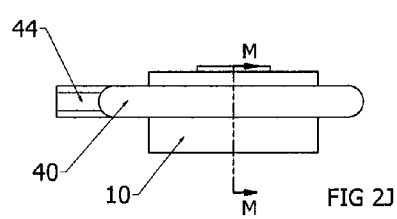
Figure 2L:
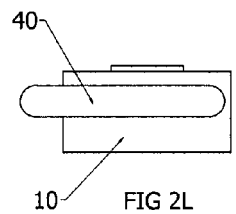
Figure 2K:
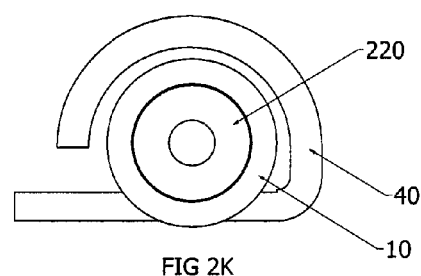

In FIGS. 5A-B, scope mounts in accordance with the invention are illustrated for a rifle, such as an M1A or M14 rifle, which use a fastener similar to that illustrated in FIGS. 1A-M in place of the conventional thumb screw that would otherwise be used for such application. In the embodiment illustrated in FIG. 5A, a Weaver style scope mount (400) is shown having a bracket, such as side plate or receiver plate (402), and a base, such as scope mounting bracket (404), with Weaver style scope rings (406 and 408) for connecting a scope to the scope mount (404). The side plate (402) is connected to the rifle via the fastener of FIGS. 1A-M by unlocking the fastener (as shown in FIG. 1G) and rotating the fastener until the bottom of ring (32) engages the abutting surface of the side plate (402) and then rotating the cam (40) into the locked position (as shown in FIG. 1M) using handle (42) so that the bottom of cup (10) is driven into engagement with the abutting surface to lock the fastener in position or place. Once connected in this manner, the fastener will resist loosening due to vibration experienced during operation of the firearm thereby keeping the scope mount and scope securely fastened to the firearm. The tool end 46 of the cam (40) is equipped with a hex key for tightening and loosening hex head socket screws used elsewhere on the rifle and/or the rifle mount (e.g., like those used to secure the scope rings (406 and 408) to the scope mount (404) and those used to secure the side panel (402) to the scope mounting bracket (404), etc.). An additional benefit of the illustrated scope mount design is that it positions the scope low over the barrel of the rifle so that the rifle operator gets a comfortable and accurate scope position to use while firing.

In the embodiment illustrated in FIG. 5B, a Picatinny style scope mount (430) is shown having a side plate (432) and a scope mounting bracket (434) each with a row of picatinny rails (432*a*) and (434*a*), respectively. The scope mount (430) may be connected to the rifle using a fastener like the one illustrated in FIGS. 1A-M in a manner similar to that discussed above with respect to scope mount 400. In the form illustrated, the picatinny rails (432*a* and 434*a*) form a tenon for mating with a corresponding mortise or mortises located on accessories to be attached to the rails in a tenon and mortis or dovetail configuration. In this form, scope rings would be connected to the picatinny rail (434*a*) of the scope mount bracket (434) while other accessories, such as flashlights, laser pointers, laser range finders, etc., could be attached to the picatinny rail (432*a*) of the side plate (432).

Although the scope mounts illustrated have been Weaver style and Picatinny style, it should be understood that fasteners in accordance with the concepts disclosed herein could be used on many other styles of scope mounts (e.g., 22 rings/Tip-off rings/dovetail rings, Redfield/Leupold style mounts, dual dovetail systems, clamp-on mounts, etc.), as well as many other completely different applications beyond just scope mounts. For simplicity and convenience, U.S. Pat. Nos. 7,694,450 and 7,272,904 and U.S. Patent Application No. 2006/0207156 are hereby incorporated herein by referenced in their entirety, rather than reciting several paragraphs that would end up being redundant to that which is disclosed in these documents.

In still other embodiments, the fastener disclosed herein may be equipped with additional items, such as an outer sleeve, to help assist in the operation of the fastener and/or identify the type of fastener or application the fastener is suited for. For example, an outer sleeve made of a polymeric material (either natural or synthetic), such as a plastic or rubber, may be used to surround the fastener and assist in holding the locking pin in place (e.g., holding the pin in the position it is left in by a user and/or prevent the pin from sliding out of the fastener). This sleeve may also protect the fastener and/or the surrounding environment (e.g., the surface or surfaces to which the fastener is being attached). In addition, the sleeve may be provided in a variety of different colors to customize the fastener or designate some property of the fastener or its intended application (e.g., providing a user preferred design, designating thread pitch, threaded shaft size, spring tension, metric/English, etc.). Methods associated with the addition of this outer sleeve and/or its uses are also contemplated.

Figure 6:
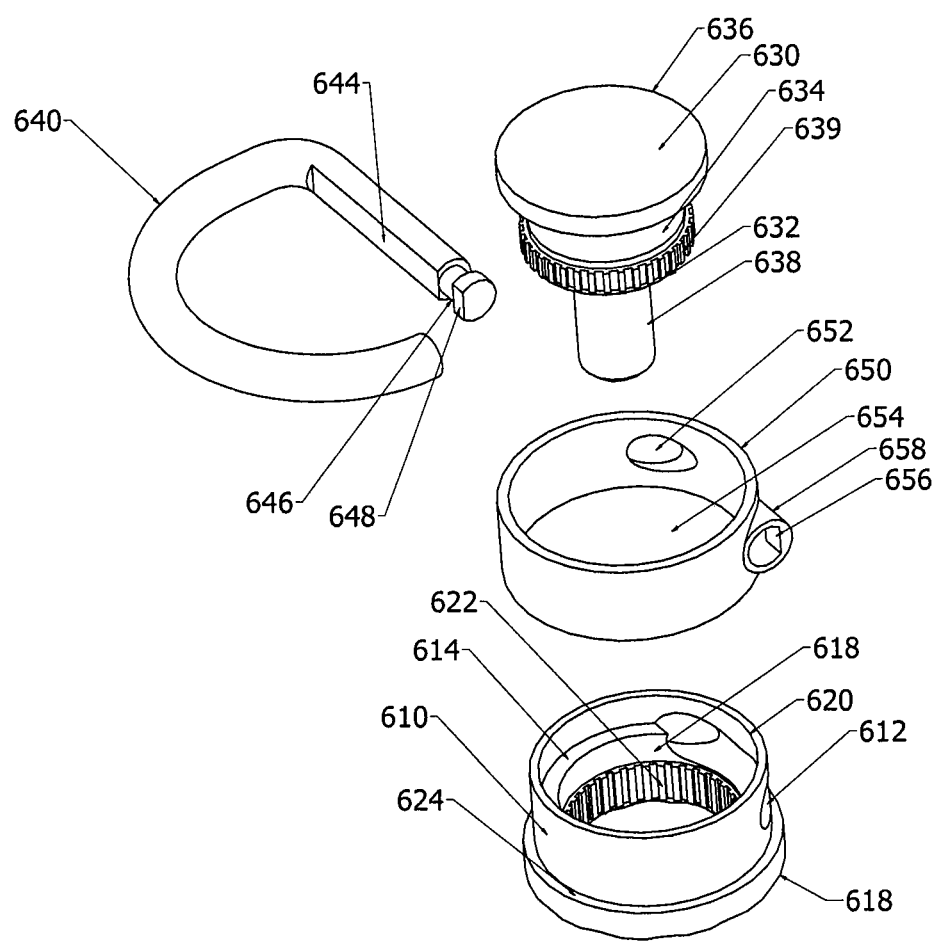
FIG. 6 is an exploded perspective view of a screw type fastener in accordance with one form of the present invention illustrating an additional sleeve.

An example of such an alternate embodiment is illustrated in FIG. 6. For convenience, items that are similar to those discussed above will use similar two-digit reference numerals, however, with the addition of the prefix "6" simply to distinguish one embodiment from another. The embodiment illustrated in FIG. 6 shows a variation of the previous fastener embodiments with the addition of a spline pattern (639) on the shoulder (632) of screw (630) which meshes or mates with the spline pattern (622) of cup (610). This spline engagement prevents the screw (630) from rotating with respect to the cup (610), similar to the rosette engagement of the embodiment shown and discussed in FIGS. 1A-H above. The embodiment of FIG. 6 also shows the addition of a sleeve (650) which is fitted to the cup (610) and abuts to the shoulder (624) of the cup (610). The sleeve (650) provides a means of capturing the locking pin (640) by means of a key (656) inside the sleeve passage (652) that engages a groove (646) in the end of the locking pin (640). Thus the locking pin (640) is prevented from sliding forward or aft along the secondary axis normal to the primary axis of the fastener. Only by rotating the locking pin (640) to a specific orientation relative to the sleeve key (656) and the locking pin flat (648) is it possible to remove or insert the locking pin (640) past the sleeve key (656). This engagement prevents involuntary disassembly of the fastener components. By means of a slightly undersized sleeve hole (652) compared to the locking pin diameter (640), the locking pin (640) resists rotating when engaged in the sleeve hole (652). This resistance keeps the locking pin in a set orientation until the user chooses to move or rotate the locking pin (640). The sleeve (650) being made of a compliant material also provides abrasion resistance to other surfaces that may come into contact with the screw assembly, as well as providing a means of color coding.

As mentioned above, a variety of sleeve colors or designs may be used to customize and/or differentiate one fastener type from another. For example, different colors could allow the end user to specify varying bolt grip force, different threads, different measurement systems or scales, etc. For example, a line of fasteners may be provided using different colors to designate metric fasteners from Imperial fasteners. In another form, different colors may be used to differentiate between fasteners of varying grip force or spring tension. In other forms, different colors may be used to designate different thread pitches or different fastener sizes. In still other forms, different colors may be used simply to allow the user to customize his or her bolts for a desired purpose. For example, fasteners may be contracted for and purchased in a specific color in keeping with a consumer's desired trade dress or color scheme for a particular product or product line. Alternatively, an on-demand customization business model may be adopted (whether pre or post sale) that allows consumers to designate specific designs or colors they wish the sleeve to be produced in. For example, a particular camouflage design may be requested by a hunting or sporting goods chain for fasteners to be sold in their stores, or a particular design/pattern may be requested by a rifle scope manufacture for fasteners to be sold with their scope mounts.

As illustrated in FIG. 6, the sleeve (650) may also be configured to be symmetric along the secondary normal axis of the primary fastener axis so it can be orientated to be left or right handed. Thus, in the embodiment illustrated, the fastener is shown configured for a left-handed person, however, the outer sleeve (650) could be flipped over and the actuator (640) repositioned to align with the sleeve so that the fastener is more comfortable for a right-handed person to use. It should also be noted that the spline and or sleeve is not restricted to the view shown in FIG. 6 and could be used in combination with any of the previous embodiment discussed.

In FIG. 6, the fastener is illustrated with the handle or actuator (40) in a locked or lowered position so that the flat (644) is positioned away from the lower surface of the fastener head (630). In this configuration (assuming assembled and not exploded as shown), the actuator (640) cams against the fastener head (630), thereby increasing frictional engagement between the fastener head (630) and the cup (610) and between the lower surface (618) of cup (610) (and optionally ring (632) as mentioned above) and the surface to which the fastener is connected. In this embodiment, the actuator (640) cannot be removed from the fastener and the fastener assembly cannot be disassembled while the actuator (640) is in this position.

The actuator (640), could be rotated ninety degrees from the position illustrated in FIG. 6 to an upright position (similar to that shown in FIGS. 1A-G and 2A-G for prior embodiments) to put the actuator (640) in an unlocked position so that the flat (644) is positioned near or adjacent the lower surface of fastener head (630). In this configuration, no cam effect is applied to the cup (610) or head (630) and the fastener can be rotated (e.g., tightened, loosened, etc.) with respect to the surface to which the fastener is connected. However, unlike the embodiments illustrated in FIGS. 1A-2M, the actuator (640) would not be removable from the fastener and/or the fastener could not be disassembled simply by placing the actuator (640) in the upright position. Rather, in view of the shape/configuration of key opening (656) of the sleeve passage (658), the actuator (640) would have to be rotated another ninety degrees (or one hundred eighty degrees from that shown in FIG. 6) in order to align the flat (644) with the corresponding flat wall of key 656 in order to remove the actuator (640) from the fastener and/or disassemble the fastener. It should be understood that when the actuator (640) is in this position (e.g., one hundred eighty degrees from that illustrated in FIG. 6), there could be a camming force applied between the actuator (640) and fastener head (630). However, in a preferred form and so long as the fastener has been unscrewed from tight engagement with the surface to which it is being connected, the fastener materials will provide sufficient give to allow for the actuator (640) to be removed from the cup (610) and outer sleeve (650) so that the fastener can be disassembled.

In yet another form, the outer sleeve (650) may be configured to cover more of the fastener if desired. For example, in one form, the outer sleeve (650) may form a cover that covers at least a portion of the screw or bolt head (630) in order to keep the screw or bolt captured within the cup (610). In this way the outer sleeve (650) not only helps keep the actuator (640) connected to the fastener, but also helps keep other portions of the fastener assembled or connected. In another form, the outer sleeve (650) may alternatively or in addition, cover at least a portion of the bottom of the cup (610) (or sleeve if implemented in a nut type fastener embodiment like that illustrated in FIGS. 2A-M). This would further assist in making the fastener a non-marring type fastener to protect the outer surface of the structure to which the fastener is being connected. For example, in one form the outer sleeve (650) may form an outer cup type structure into which at least a portion of cup (610) is disposed. The bottom wall of the outer cup type structure would define an opening through which the shank (638) of the fastener would be disposed and would preferably be thin and tight enough that the scalloped pattern (618) of cup (610) (or any other texture or design that appears on the bottom thereof) would be replicated on the bottom of the outer sleeve (650) to provide similar benefits as those discussed above with respect to the addition of these patterns, textures or designs. In this way the outer sleeve (650) forms a coating applied to an exterior surface of the fastener to prevent the fastener from marring or abrading a surface to which the fastener is connected. It should also be understood that in other forms, the cup (610) and sleeve (650) may be integrated into one component if desired.

It should also be appreciate that associate methods for manufacturing, assembling and customizing fasteners like those discussed above are also contemplated herein. For example, a method of customizing a fastener using specific designs (including color alone) to denote a property of or intended use for the fastener is disclosed herein. Similarly, method of manufacturing non-marring and abrasion resistant fasteners are disclosed herein, as are methods for manufacturing ambidextrious fasteners.

Thus, it is apparent that there has been provided, in accordance with the invention, a fastener and methods relating to same that fully satisfy the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:
1. A locking fastener comprising:
an outer body defining an opening therein;
an inner body disposed within the opening of the outer body and aligned coaxially with the outer body about a primary axis; and a cam operator inserted at least partially through a portion of the inner and outer bodies and connecting the inner and outer bodies to one another to form the locking fastener, the cam operator being rotatable about a secondary axis that is generally normal to the primary axis and movable between a first position wherein the inner and outer bodies are rotatable with respect to a surface or structure located adjacent or proximate to the inner and outer bodies and to which the fastener is being fastened, and a second position wherein the inner and outer bodies are not rotatable with respect to the adjacent or proximate surface or structure and the inner and outer bodies are fastened to the adjacent or proximate surface or structure;

wherein the outer body defines at least one opening through which at least a portion of the cam operator is inserted; and the inner body defines a passage through which the at least a portion of the cam operator is inserted so that rotation of the cam operator between the first position and second position causes the cam operator to engage at least a portion of the inner body and exert a downward force on the outer body to prevent the inner and outer bodies from rotating with respect to the adjacent or proximate surface or structure to which the fastener is being fastened.

2. The fastener of claim 1 wherein the fastener is a screw or bolt type fastener and the inner body comprises a screw or bolt having an elongated member with a longitudinal axis that is coaxial to the primary axis, the elongated member having an externally threaded portion of a first diameter and an upper portion of a second diameter larger than the first diameter and defining the passage through which the at least a portion of the cam operator is inserted.

3. The fastener of claim 2 wherein the upper portion of the elongated member comprises a shoulder portion and a head located above the shoulder portion and spaced apart therefrom to define the passage through which the at least a portion of the cam operator is inserted;

wherein rotation of the cam operator from the first position to the second position causes the at least a portion of the cam operator inserted into the passage to engage a bottom surface of the head of the elongated member and exert a downward force on the at least one opening of the outer body to prevent the inner and outer bodies from rotating with respect to the adjacent or proximate surface or structure to which the fastener is being fastened.

4. The fastener of claim 1 wherein the inner body defines a bore having an axis coaxial to the primary axis of the fastener and through which at least a portion of an externally threaded screw or bolt is disposed.

5. The fastener of claim 4 wherein the fastener is a nut type fastener and the inner body bore is internally threaded for mating with the external threads of the screw or bolt.

6. The fastener of claim 5 further comprising a washer connected to the inner body which together with the passage of the inner body forms a generally C-shaped channel into which at least a portion of the cam operator is inserted;

wherein rotation of the cam operator from the first position to the second position causes at least a portion of the cam operator inserted into the channel to engage a bottom surface of the washer and exert a downward force on at least one opening of the outer body to prevent the inner and outer bodies from rotating with respect to the adjacent or proximate surface or structure to which the fastener is being fastened.

7. A method of fastening a first and second article, the method comprising:

providing a locking fastener having an outer body defining an opening therein, an inner body disposed within the opening of the outer body and aligned coaxially with the outer body about a primary axis, and a cam operator inserted at least partially through a portion of the inner and outer bodies and connecting the inner and outer bodies to one another to form the locking fastener, the cam operator being rotatable about a secondary axis that is generally normal to the primary axis and movable between a first position wherein the inner and outer bodies are rotatable with respect to a surface or structure located adjacent or proximate to the inner and outer bodies and to which the fastener is being fastened, and a second position wherein the inner and outer bodies are not rotatable with respect to the adjacent or proximate surface or structure and the inner and outer bodies are fastened to the adjacent or proximate surface or structure; and fastening the first and second articles to one another by securing the fastener to the first and second articles so that the inner body is positioned proximate to one of the articles and then rotating the cam operator from the first position to the second position so that the outer body is pressed against one of the first and second articles and the first and second articles are fastened together.

8. A method for fastening a nut or collar type fastener, comprising:

providing a cup defining an opening therein, a sleeve disposed within the opening of the cup and aligned coaxially with the cup about a primary axis, the sleeve defining a bore that is at least partially internally threaded and a passage and, and a cam operator inserted at least partially through a portion of the cup and the passage of the sleeve such that the cam operator connects the cup and sleeve to one another to form a nut or collar type fastener, the cam operator being rotatable about a secondary axis that is generally normal to the primary axis and movable between a first position wherein the cup and sleeve are rotatable with respect to a first and second article to which the nut or collar type fastener is being fastened, and a second position wherein the cup and sleeve are not rotatable with respect to the first and second article and secure the first and second article to one another; and fastening the cup and sleeve to one another by moving the cam operator from the first position to the second position so that a clamping force is applied to the cup and sleeve to prevent the cup and sleeve from moving with respect to the first and second article.

9. A locking fastener comprising:

an outer body defining an opening therein;

an inner body disposed within the opening of the outer body and aligned coaxially with the outer body about a primary axis;

a cam operator inserted at least partially through a portion of the inner and outer bodies and connecting the inner and outer bodies to one another to form the locking fastener, the cam operator being rotatable about a secondary axis that is generally normal to the primary axis and movable between a first position wherein the inner and outer bodies are rotatable with respect to a surface or structure located adjacent or proximate to the inner and outer bodies and to which the fastener is being fastened, and a second position wherein the inner and outer bodies are not rotatable with respect to the adjacent or proximate surface or structure and the inner and outer bodies are fastened to the adjacent or proximate surface or structure; and an outer sleeve defining a first opening within which at least a portion of the outer body or inner body are disposed and having a first longitudinal axis that is coaxial with respect to a longitudinal axis of either the outer body or inner body, and further defining a second opening having a longitudinal axis that is transverse to and tangential to the first longitudinal axis of the outer sleeve within which at least a portion of the cam operator is disposed.

10. A locking fastener according to claim 9, wherein the outer sleeve includes a key for engaging a mating surface of the cam operator to prevent accidental removal of the cam operator from the fastener and/or accidental disassembly of the fastener.

11. A locking fastener according to claim 9, wherein the outer sleeve includes a predetermined design to customize the fastener.

12. A locking fastener according to claim 11, wherein the predetermined design is a color scheme that designates a property of the fastener or an intended application for the fastener.

13. A locking fastener according to claim 9, wherein the outer sleeve is positioned on the fastener in a first orientation that caters to a right-handed person and is symmetrical about a point of reference such that the outer sleeve may be removed from the fastener, reorientated and replaced back on the fastener in a second orientation different from the first orientation that caters to a left-handed person thereby making the fastener an ambidextrous fastener.

\* \* \* \* \*